April 17, 1951     M. P. LAUGHLIN     2,549,317
LAWN MOWER
Filed Aug. 6, 1946
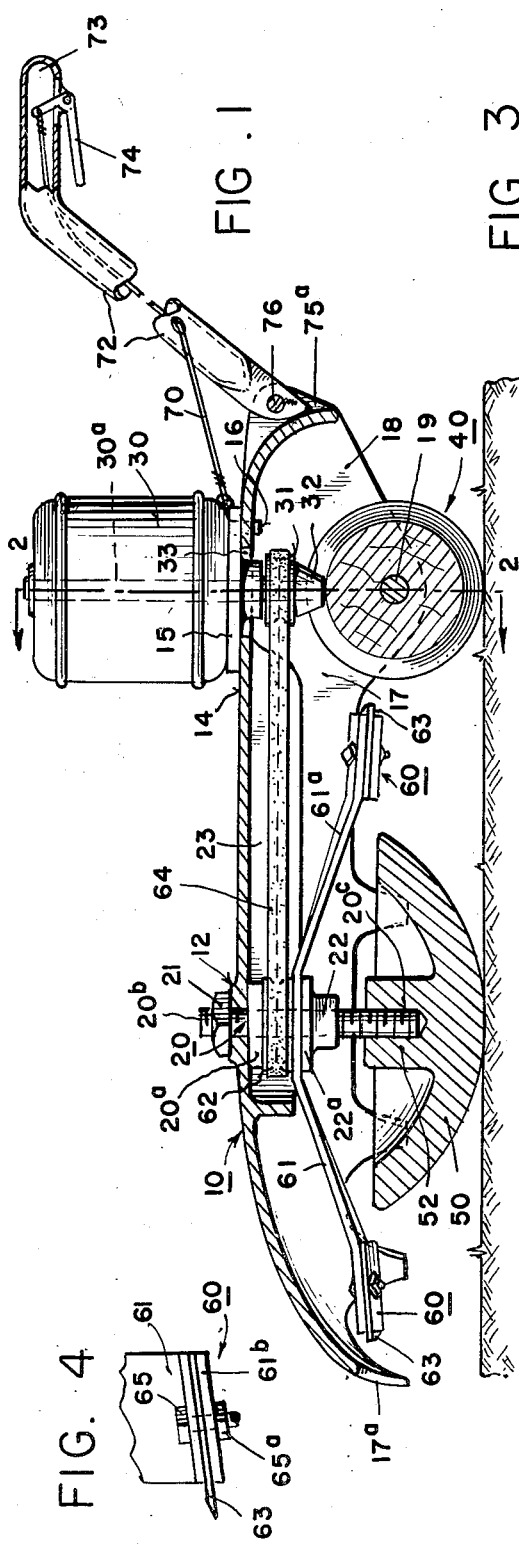
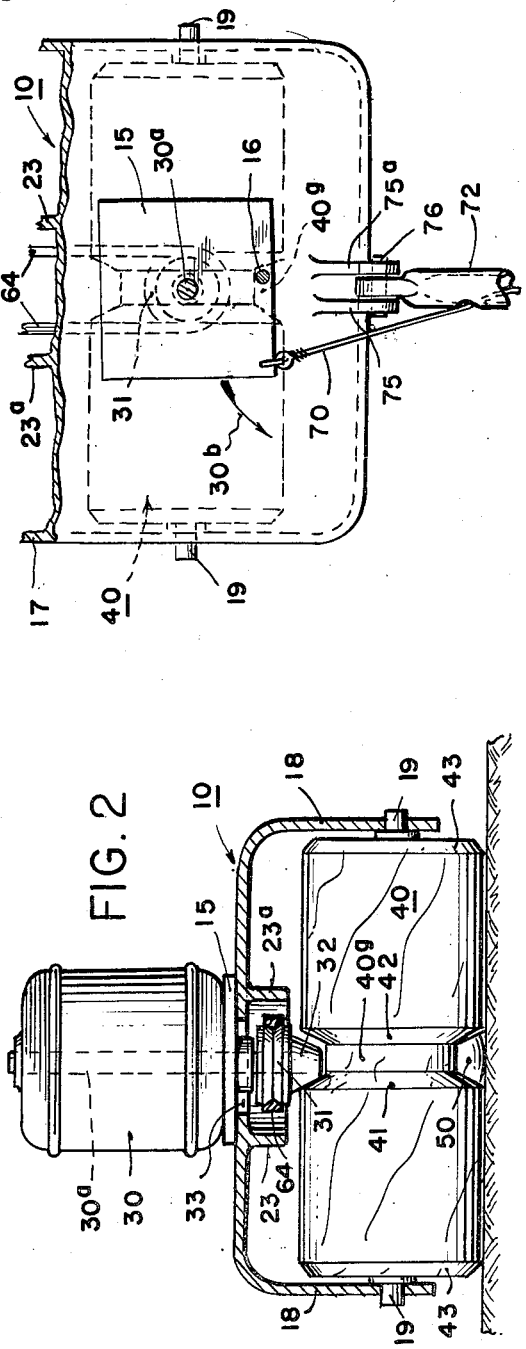
INVENTOR
MYRON P. LAUGHLIN,
BY
ATTORNEY Patented Apr. 17, 1951

2,549,317

UNITED STATES PATENT OFFICE 2,549,317

LAWN MOWER

Myron P. Laughlin, Atlanta, Ga.

Application August 6, 1946, Serial No. 688,641

8 Claims. (Cl. 56—25.4)

This invention relates to lawnmowers, and more particularly to lawnmowers of the self-propelled type employing cutters mounted upon an arm which is revolved rapidly in a horizontal plane to produce the necessary cutting stroke; a type of mower which heretofore has lacked the safety of the so-called reel type of mower. The cutting in such mowers must be accomplished at a relatively high speed and objects of substantial weight struck by the rapidly rotating blades, are often thrown violently, while the operators are further endangered through possible contact with the blades themselves which in the usual structures are often inadequately guarded or completely exposed in an attempt to increase cutting range.

The herein disclosed invention provides for interposing a substantial mass between the operator's feet and any thrown objects and for the adequate guarding of the rotating blade against contact with the operator's or a bystander's feet without decreasing the cutting ability of the blades or their accessibility.

It further provides for the protection of the rotating blade from contact with inequalities in the ground and from objects lying thereon, having the further object of providing means which protects the cutter from contact or entanglement with the electrical supply cord (should it be passed over) when electromotive propulsion means are employed, thus removing the heretofore great obstacle to the use of electrical propulsion means and permitting cord retriever devices to be dispensed with.

Rotary mowers, so-called, have previously used power means to propel the rotary cutter, but due to the necessary great divergence in speed between cutter and ground propulsion means, have not ordinarily employed power propulsion, since mechanism thought necessary involved considerable expense and complication.

It is the object of this invention to provide means of greatest simplicity, wherein drive, clutch and propulsion means are a single, simple, easily manufactured unit providing at once the necessary speed reduction and the ability to disengage the power unit from the ground wheels whenever necessary.

It is the further object of this invention to provide such extreme simplicity of mechanism as to assure reliability of operation, ease of repair and low cost of initial fabrication, while at the same time so arranging the cutting means and its guards that grass beneath low bushes and closely adjacent to fences, walls or other obstacles, may be fully and easily cut with attendant elimination of the expensive, time-consuming, edge trimming operation.

It is the prime object of this invention to provide a power operated lawnmower which may be operated by a child or a woman in perfect safety and with a minimum of effort.

Fig. 1 is a cross-sectional elevation of a mower according to the present invention, taken generally on the longitudinal center line thereof;

Fig. 2 is an elevation in partial cross-section taken on the line 2—2 of Fig. 1 in the direction of the arrows and at substantial right angles to the previous section.

Fig. 3 is a fragmentary top view of the mower and its drive mechanism shown in Figs. 1 and 2.

Fig. 4 is a detail of the cutter element.

Referring particularly to Figs. 1 and 2; 10 represents a suitable elongated casing or platform preferably cast as a unit and provided at its forward end and on its longitudinal center line with a seat 12 wherein mounts the arbor 20, upon which the revolving cutter rotates. Casing 10 is also provided with a mounting surface 14 upon which the base 15 of a prime mover 30 (here shown as an electric motor) is secured through a pivot pin 16. At its sides and front, casing 10 is preferably formed with depending side and front flanges 17, 17a, respectively, shown to be serrated, and which function as cutter guards, the side flanges 17 in their rearward portion providing bearings 18, wherein journal pins 19 upon which the ground wheel or roller 40 revolves.

Cutter arbor 20 consists of a suitable stationary post having threaded ends and being formed adjacent its upper end with an integral flange 20a. By reference to Fig. 1, the upper threaded end 20b of the post is extended through the aforesaid casing seat 12, being verticaly positioned by the flange 20a, and receives a securing nut 21 by which the post is secured to the casing on its longitudinal center line and projects downwardly therefrom. The lower threaded end 20c of the post is threaded into a ground shoe 50 which, by virtue of its threaded connection with the post, serves simultaneously to adjust and thereby prevent the cutters from digging into the ground and to support the forward end of the mechanism.

Cutter arms 61, 61a are secured to and rotate with a pulley 62 journaled for rotation on the unthreaded intermediate portion of the arbor post 20, the pulley and cutter arms being clamped between the flange 20a, which serves as a top bearing for the pulley, and a collar 22 threaded on to the post and having an upper flange 22a serving as a bottom bearing for the pulley and cutter arms. Preferably, the cutter arms are rigidly secured to the radial face of the lower flange of the pulley 62 by suitable means such as screws (not shown), but other means for driving the cutter arms from the pulley may be employed. The pulley is driven through a belt 64 operating between under-face guard ribs 23, 23a on the casing 10 from sheave 31 mounted directly upon the shaft 30a of motor 30. The lower end of the motor shaft, below the sheave 31, is provided with a cone-shaped friction cone 32.

Motor 30, as has been described, is pivotally secured to the casing 10 through the aforesaid pivot pin 16 and shaft opening 33 in the casing 10 is of such size that the motor may be swung sidewise as indicated by the arrow 30b in Fig. 3 to bring the friction cone 32 in and out of contact with the friction surface 41 upon the roller 40, which is circumferentially grooved, as at 40g, to provide clearance for cone 32 when the motor is swung to the right.

The tension of belt 64, together with the motor pull thereon serves to disenage the friction surfaces 32 and 41, while their engagement is secured manually through a pull wire 70 extending, through the mower steering handle 72 to the hand grip 73 thereof, pull on the Bowden wire being controlled as by means of a trigger 74 mounted in the hand grip as is conventional in power mower controls.

It will be noted that the structure described provides for the prime mover (the heaviest element of the whole structure) being almost directly over the center of the supporting wheel or roller 40 while the handle 72 is secured rearwardly thereto through such means as lugs 75, 75a and a connecting pin 76 (Fig. 3) and the cutter mechanism projects forwardly from such centerline. Thus it will be seen that a substantial balanced structure may be provided wherein the major weight is concentrated over the traction means, thus securing most effective contact with the surface over which the device travels, while at the same time any downward component of the thrust upon handle 72 serves to lift the cutter element over an obstacle rather than force the same into the ground as has been a common fault of prior mechanisms.

Further it will be noted that the shoe 50 is called upon to bear only that fraction of the weight of the cutter mechanism and the casing, unbalanced by the weight of the handle and the thrusts thereon. Thus the "digging in" and "scalping" characteristics of such former devices are obliterated and a simple shoe may be used to replace the wheels and castors heretofore thought essential.

The shoe 50 is preferably formed as an inverted dome having substantial radii, so that it slides easily up and over smaller obstacles encountered, which will pass beneath the guard portion 17a, such as a power cord or the like, lying in the grass. Shoe 50 is provided with a center threaded portion 52 which permits its adjustment upon post 20 to alter the spacing between the contact surface of the shoe and the cutters 60 without, at the same time, projecting the cutters 60 downwardly to an exposed position beneath the cutter guards 17, 17a. Thus the height of cut may be altered while still maintaining all safety features.

Referring to Fig. 4, the cutters 60 are preferably each composed of a cutting blade 63 which is clamped between a protective plate 61b and the end of arm 61 by means of a single bolt 65 and its nut 65a, thus providing for ready cutter detachment, and at the same time, assuring all possible protection for the cutter blades 63. Cutter blades 63 may thus be formed of extremely thin steel and will be substantially self-sharpening as their edges wear away; this being possible because these blades are not called upon to provide great mechanical strength or withstand chance blows from stones and the like often encountered on rough ground.

Propulsion and supporting roller 40 may be of wood or the like in one or more pieces and a differential mechanism will be unnecessary since unit pressure at any point of ground contact is low and the curvatures 43 at either end thereof provide for easy sidewise slipping movement of the same and permit pivoting about the shoe 50 when turns are made. The main movement of such devices is, of course, in a substantially straight line forward drive, thus providing for the major portion of the cutting operation, but it will be obvious that where a reverse motion is desirable, groove surface 42 may also be formed as a friction surface similar to the friction surface 41 whereby contact of the drive cone 32 therewith will reverse the motion.

While for purpose of simple disclosure I have illustrated the constructional details of one embodiment of power mower according to the invention giving excellent results in actual practice, it will of course be understood by those skilled in the art that other forms of generic cutter mechanisms and other types of prime movers, all in combination with the illustrated driving and supporting means, may be substituted for those shown without departing from the scope of the invention as defined by the appended claims and that, as respects the aforesaid driving and supporting means, these may also be varied without departing from the principle of the invention as comprehended by and within the appended claims.

What I claim is:

1. A power mower comprising, in combination, an elongated platform, a ground-engaging propulsion roller below and supporting the rear end of the platform, a non-rotary ground-engaging shoe below and supporting the front end of the platform at substantially the medial line thereof, cutter means mounted above said shoe and beneath said platform, a prime mover supported on said platform, a driving connection between said prime mover and said cutter means, said propulsion roller extending substantially the full width of the rear end of said platform and having ground contact for substantially said width thus to serve as a cutter rear guard disposed between said cutter means and the feet of the mower operator, said propulsion roller being provided intermediate its ends with a groove, and a drive connection from said prime mover to said propulsion roller operative in said groove.

2. A power mower as defined in claim 1, wherein the roller drive connection includes a friction drive element extending into said groove for frictional driving engagement with a side thereof.

3. A power mower as defined in claim 1, wherein said prime mover is movably mounted on the platform, and said roller drive connection includes a friction-drive element movable with said prime mover and extending into the roller groove for frictional driving engagement with a side of said groove, and wherein means are provided for manually moving said prime mover as required to engage said friction-drive element with said groove side.

4. A power mower as defined in claim 1, wherein said prime mover comprises a vertically disposed motor whose drive shaft extends through said platform, and said roller drive connection includes said drive shaft and a friction-drive element mounted thereon and extending into the roller groove for frictional driving engagement with a side of said groove, and wherein means are provided to engage and disengage the friction-drive element with and from said groove side.

5. A power mower comprising, in combination, a rotary cutter having a combined support and guard shoe disposed therebeneath to support the cutter and guard the cutter from beneath, a platform extending over said cutter and shoe having one of its ends supported by said shoe, a propulsion and guard roller supporting the other end of said platform and extending across substantially the full width thereof to provide a rear guard for said cutter, a prime mover mounted on said platform above said roller, power transmission means extending through said platform and drivingly connecting said prime mover with said cutter and said roller, and side flanges depending from said platform and providing side guards for the cutter.

6. A power mower as defined in claim 5, wherein the propulsion and guard roller extends between and is supported for rotation by said side flanges.

7. A power mower comprising, in combination, a platform, a semi-spherical non-rotary ground shoe supporting the front end of the platform, an elongated ground-engaging propulsion roller supporting the rear end of the platform, a rotary cutter mounted above said shoe and beneath said platform and in front of said roller, a prime mover mounted on said platform, and power transmission connections extending through said platform to the cutter and to the roller for powering the same from the prime mover.

8. A power mower comprising, in combination, an elongated platform mounting a prime mover adjacent one of its ends and a rotary cutter adjacent to and beneath its other end, said platform having depending flanges providing cutter side guards, a guard and support roller extending between said flanges at the prime mover end of the platform and providing a cutter rear guard for protecting the operator's feet from said cutter and objects thrown thereby, a semi-spherical guard and support shoe mounted from said platform beneath said cutter to support the cutter and the cutter end of the platform and to guard the under side of said cutter, and power transmission means connecting said prime mover to said roller and to said cutter.

MYRON P. LAUGHLIN.

REFERENCES CITED

The following references are of record in the file of this patent:

UNITED STATES PATENTS

| Number | Name | Date |
|---|---|---|
| 669,437 | Coldwell et al. | Mar. 5, 1901 |
| 1,127,260 | Jones | Feb. 2, 1915 |
| 1,170,877 | Colwell et al. | Feb. 8, 1916 |
| 1,891,526 | Dupuis | Dec. 20, 1932 |
| 2,076,056 | Woodford | Apr. 6, 1937 |
| 2,134,115 | Flammang | Oct. 25, 1938 |
| 2,166,450 | Smalley | July 18, 1939 |
| 2,225,139 | Urschel | Dec. 17, 1940 |
| 2,232,671 | Loder | Feb. 18, 1941 |
| 2,278,922 | Goodall | Apr. 7, 1942 |
| 2,287,126 | Packwood | June 23, 1942 |
| 2,312,972 | Orr | Mar. 2, 1943 |
| 2,329,372 | Hitch | Sept. 14, 1943 |
| 2,476,394 | Webb et al. | July 19, 1949 |
| 2,476,526 | Badlot | July 19, 1949 |
| 2,478,558 | Beranek et al. | Aug. 9, 1949 |
| 2,488,140 | Phillips et al. | Nov. 15, 1949 |
| 2,513,685 | Smith et al. | July 4, 1950 |

FOREIGN PATENTS

| Number | Country | Date |
|---|---|---|
| 107,917 | Australia | July 6, 1939 |